US012769445B2

(12) United States Patent
Chen

(10) Patent No.: US 12,769,445 B2
(45) Date of Patent: Oct. 20, 2026

(54) MEMORY CAPACITY EXPANSION OF A MEMORY MODULE

(71) Applicant: IEIT SYSTEMS CO., LTD., Jinan (CN)

(72) Inventor: Xi Chen, Jinan (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 42 days.

(21) Appl. No.: 18/877,652

(22) PCT Filed: Jul. 24, 2023

(86) PCT No.: PCT/CN2023/108964
§ 371 (c)(1),
(2) Date: Dec. 20, 2024

(87) PCT Pub. No.: WO2024/139198
PCT Pub. Date: Jul. 4, 2024

(65) Prior Publication Data

US 2025/0383766 A1 Dec. 18, 2025

(30) Foreign Application Priority Data

Dec. 29, 2022 (CN) ......................... 202211701751.7

(51) Int. Cl.
*G06F 3/06* (2006.01)

(52) U.S. Cl.
CPC .......... *G06F 3/0608* (2013.01); *G06F 3/0629* (2013.01); *G06F 3/0673* (2013.01)

(58) Field of Classification Search
CPC ..... G06F 3/0608; G06F 3/0629; G06F 3/0673
See application file for complete search history.

(56) References Cited

U.S. PATENT DOCUMENTS 10,545,672 B2 1/2020 Cui et al.
2004/0264256 A1* 12/2004 Mauritz ............. G06F 13/4086 365/189.08

(Continued)

FOREIGN PATENT DOCUMENTS

CN 103488436 A 1/2014
CN 205091735 U 3/2016

(Continued)

OTHER PUBLICATIONS

English Translation of PCT International Search Report mailed on Oct. 11, 2023 for PCT/CN2023/108964 (2 pages).

(Continued)

*Primary Examiner* — Tracy A Warren
(74) *Attorney, Agent, or Firm* — Merchant & Gould P.C.

(57) ABSTRACT

The present disclosure belongs to the technical field of storage chip designs. Disclosed are a memory module and an electronic device. The memory module includes at least two memory expander controller (MXC) chips, a peripheral component Interconnect express (PCIe) golden finger, a multichannel input/output (MCIO) connector, and a dual inline memory module (DIMM), wherein the MXC chips are connected to the DIMM through a double data rate 5 (DDR5) synchronous dynamic random access memory (DRAM) interface controller port, a compute express link (CXL) port of at least one of the MXC chips interacts with an external device through the PCIe golden finger, and the CXL port of at least one of the MXC chips interacts with the external device through the MCIO connector. The present disclosure may improve the memory capacity of the memory module.

20 Claims, 5 Drawing Sheets

(56) References Cited

U.S. PATENT DOCUMENTS

| | | | | |
|---|---|---|---|---|
| 2009/0271556 | A1* | 10/2009 | Rutherford, III | G06F 13/4022 710/313 |
| 2015/0113198 | A1 | 4/2015 | Li et al. | |
| 2021/0132798 | A1* | 5/2021 | McGlaughlin | G06F 3/0635 |
| 2022/0179463 | A1* | 6/2022 | Keeth | G06F 13/409 |
| 2024/0006791 | A1* | 1/2024 | Wang | H01R 31/06 |
| 2024/0028244 | A1* | 1/2024 | Weinberg | G06F 3/0679 |
| 2024/0176740 | A1* | 5/2024 | Simmadhari Ramadass | G06F 12/0877 |
| 2024/0211424 | A1* | 6/2024 | Kim | G11C 5/148 |
| 2025/0110539 | A1* | 4/2025 | Wang | G06F 1/3206 |

FOREIGN PATENT DOCUMENTS

| | | | |
|---|---|---|---|
| CN | 106155577 | A | 11/2016 |
| CN | 109684257 | A | 4/2019 |
| CN | 215181829 | U | 12/2021 |
| CN | 114675722 | A | 6/2022 |
| CN | 115686153 | A | 2/2023 |
| WO | 2018141174 | A1 | 8/2018 |
| WO | 2021254368 | A | 12/2021 |

OTHER PUBLICATIONS

First Chinese Search Report for Application No. 2022117017517 (2 pages).
Second Chinese Search Report for Application No. 2022117017517 (1 page).

* cited by examiner

MEMORY CAPACITY EXPANSION OF A MEMORY MODULE

CROSS-REFERENCE TO RELATED APPLICATION

This application is a National Stage Application of International Application No. PCT/CN2023/108964 filed on Jul. 24, 2023, which claims the benefit of Application No. 202211701751.7 filed on Dec. 29, 2022 in China, and which applications are incorporated herein by reference. To the extent appropriate, a claim of priority is made to each of the above disclosed applications.

TECHNICAL FIELD

The present disclosure relates to the technical field of storage chip designs, and in particular, to a memory module and an electronic device.

BACKGROUND

With the continuous development of computer technology, computing density continues to grow, while memory and Input/Output (I/O) scalability lags far behind the growth in computing density, and the average memory and I/O bandwidth per core continues to decline. In addition, computing data is currently growing exponentially year by year, and the demand for memory capacity is increasing. In some scenarios, performance has to be sacrificed in exchange for memory capacity expansion, which hinders the development of high-performance computing and Artificial Intelligence (AI) computing to a certain extent.

Therefore, how to increase the memory capacity of a memory module is a technical problem to be currently solved by those skilled in the art.

SUMMARY

An objective of the present disclosure is to provide a memory module and an electronic device, which may improve the memory capacity of the memory module.

In order to solve the technical problem, according to a first aspect, the present disclosure provides a memory module, including at least two Memory Expander Controller (MXC) chips, a Peripheral Component Interconnect Express (PCIe) golden finger, a Multichannel Input/Output (MCIO) connector, and a Dual Inline Memory Module (DIMM).

Wherein the memory expander controller chips are connected to the dual inline memory module, at least one of the memory expander controller chips interacts with an external device through the peripheral component interconnect express golden finger, and at least one of the memory expander controller chips interacts with the external device through the multichannel input/output connector.

Optionally, the MXC chips are connected to the DIMM through a Double Data Rate 5 (DDR5) controller port, a Compute Express Link (CXL) port of at least one of the MXC chips interacts with an external device through the PCIe golden finger, and the CXL port of at least one of the MXC chips interacts with the external device through the MCIO connector.

Optionally, the memory module includes a first MXC chip, a second MXC chip, a third MXC chip, and a fourth MXC chip. Bandwidths of the first MXC chip, the MXC chip, the MXC chip, and the MXC chip are identical, for exempla, each of the first MXC chip, the second MXC chip, the third MXC chip, and the fourth MXC chip has a bandwidth of 8 bits.

Optionally, the first memory expander controller chip and the second memory expander controller chip interact with the external device through the peripheral component interconnect express golden finger.

Optionally, the CXL port of each of the first MXC chip and the second MXC chip interacts with the external device through the PCIe golden finger.

Optionally, the PCIe golden finger is a PCIe x16 golden finger.

Optionally, the third memory expander controller chip and the fourth memory expander controller chip interact with the external device through the multichannel input/output connector.

Optionally, the CXL port of each of the third MXC chip and the fourth MXC chip interacts with the external device through the MCIO connector.

Optionally, the MCIO connector is an MCIO x16 connector.

Optionally, each of the memory expander controller chips is connected to a plurality of dual inline memory modules Optionally, each of the MXC chips is connected to two DIMMs through the DDR5 controller port.

Optionally, the memory module includes a fifth MXC chip and a sixth MXC chip. Bandwidths of the fifth memory expander controller chip and the sixth memory expander controller chip are identical. for exempla, each of the fifth MXC chip and the sixth MXC chip has a bandwidth of 16 bits.

Optionally, the fifth memory expander controller chip interacts with the external device through the peripheral component interconnect express golden finger.

Optionally, the CXL port of the fifth MXC chip interacts with the external device through the PCIe golden finger.

Optionally, the PCIe golden finger is a PCIe x16 golden finger.

Optionally, the sixth memory expander controller chip interacts with the external device through the multichannel input/output connector.

Optionally, the sixth MXC chip interacts with the external device through the MCIO connector.

Optionally, the MCIO connector is an MCIO x16 connector.

Optionally, each of the memory expander controller chips is connected to a plurality of dual inline memory modules.

Optionally, each of the MXC chips is connected to four DIMMs through the DDR5 controller port.

Optionally, the PCIe golden finger is configured to provide a reset signal for a MXC chip which is connected to the PCIe golden finger, and the MCIO connector is configured to provide a reset signal for a MXC chip which is connected to the multichannel input/output connector.

Optionally, the PCIe golden finger is configured to provide a clock input for a MXC chip which is connected to the PCIe golden finger through a beat buffer, and the MCIO connector is configured to provide a clock input for a MXC chip which is connected to the MCIO connector through a beat buffer.

Optionally, a single board where the memory module is located further includes a clock generator, configured to provide a clock input for all the MXC chips through the beat buffer.

Optionally, each of the MXC chips is connected to a corresponding Serial Peripheral Interface (SPI) flash, the SPI flash is configured to store a firmware of a MXC chip, connected to the SPI flash, of the MXC chips.

Optionally, the single board where the memory module is located further includes a Debug interface, configured to debug the single board.

Optionally, the single board where the memory module is located further includes a Power connector, configured to provide a power input for the memory module.

Optionally, the single board where the memory module is located is configured to be inserted into a PCIe slot supporting a CXL1.1 protocol platform.

Optionally, the memory module is directly connected to a server through the PCIe golden finger and the MCIO connector.

Optionally, the memory module includes four MXC chips with a bandwidth of 8 bits, or two MXC chips with a bandwidth of 16 bits.

According to a second aspect, the present disclosure further provides an electronic device. The electronic device is provided with a memory module including at least two MXC chips, a PCIe golden finger, an MCIO connector, and a DIMM.

Wherein the memory expander controller chips are connected to the dual inline memory module, at least one of the memory expander controller chips interacts with an external device through the peripheral component interconnect express golden finger, and at least one of the memory expander controller chips interacts with the external device through the multichannel input/output connector.

Optionally, the MXC chips are connected to the DIMM through a DDR5 controller port, a CXL port of at least one of the MXC chips interacts with an external device through the PCIe golden finger, and the CXL port of at least one of the MXC chips interacts with the external device through the MCIO connector.

Optionally, the memory module includes a first MXC chip, a second MXC chip, a third MXC chip, and a fourth MXC chip. Bandwidths of the first MXC chip, the second MXC chip, the third MXC chip, and the fourth MXC chip are identical, for exempla, each of the first MXC chip, the second MXC chip, the third MXC chip, and the fourth MXC chip has a bandwidth of 8 bits.

Optionally, the first memory expander controller chip and the second memory expander controller chip interact with the external device through the peripheral component interconnect express golden finger.

Optionally, the CXL port of each of the first MXC chip and the second MXC chip interact with the external device through the PCIe golden finger, and the PCIe golden finger is a PCIe x16 golden finger.

Optionally, the third memory expander controller chip and the fourth memory expander controller chip interact with the external device through the multichannel input/output connector.

Optionally, the CXL port of each of the third MXC chip and the fourth MXC chip interact with the external device through the MCIO connector, and the MCIO connector is an MCIO x16 connector.

Optionally, each of the memory expander controller chips is connected to a plurality of dual inline memory modules.

Optionally, each of the MXC chips is connected to two DIMMs through the DDR5 controller port.

Optionally, the memory module includes a fifth MXC chip and a sixth MXC chip. Bandwidths of the fifth memory expander controller chip and the sixth memory expander controller chip are identical. For exempla, each of the fifth MXC chip and the sixth MXC chip has a bandwidth of 16 bits.

Optionally, the CXL port of the fifth MXC chip interacts with the external device through the PCIe golden finger, and the PCIe golden finger is the PCIe x16 golden finger.

Optionally, the sixth MXC chip interacts with the external device through the MCIO connector, and the MCIO connector is the MCIO x16 connector.

Optionally, each of the memory expander controller chips is connected to a plurality of dual inline memory modules.

Optionally, each of the MXC chips is connected to four DIMMs through the DDR5 controller port.

Optionally, the PCIe golden finger is configured to provide a clock input for a MXC chip which is connected to the PCIe golden finger through a beat buffer, and the MCIO connector is configured to provide a clock input for a MXC chip which is connected to the MCIO connector through a beat buffer.

Optionally, a single board where the memory module is located further includes a clock generator, configured to provide a clock input for all the MXC chips through the beat buffer.

Optionally, the memory module is directly connected to a server through the PCIe golden finger and the MCIO connector.

Optionally, the memory module includes four MXC chips with a bandwidth of 8 bits, or two MXC chips with a bandwidth of 16 bits.

The present disclosure provides the memory module, including at least two the MXC chips, the PCIe golden finger, the MCIO connector, and the DIMM. The MXC chips are connected to the DIMM through the DDR5 controller port, the CXL port of at least one of the MXC chips interacts with an external device through the PCIe golden finger, and the CXL port of at least one of the MXC chips interacts with the external device through the MCIO connector.

The memory module provided by the present disclosure includes at least two the MXC chips, the PCIe golden finger, the MCIO connector, and the DIMM. The MXC chips are connected to the DIMM through the DDR5 controller port, and the MXC chips also interact with the external device through the PCIe golden finger and the MCIO connector by using own the CXL ports. The memory module is connected to the DIMM through the MXC chip expansion, which may improve the memory capacity of the memory module. The present disclosure further provides the electronic device, which has the beneficial effects and will not be elaborated herein.

BRIEF DESCRIPTION OF THE DRAWINGS

In order to more clearly illustrate the embodiments of the present disclosure, the drawings used in the embodiments will be briefly described below. It is apparent that the drawings described below are only some embodiments of the present disclosure. Other drawings may further be obtained by those of ordinary skill in the art according to these drawings without creative efforts.

DETAILED DESCRIPTION OF THE EMBODIMENTS

Figure 1:
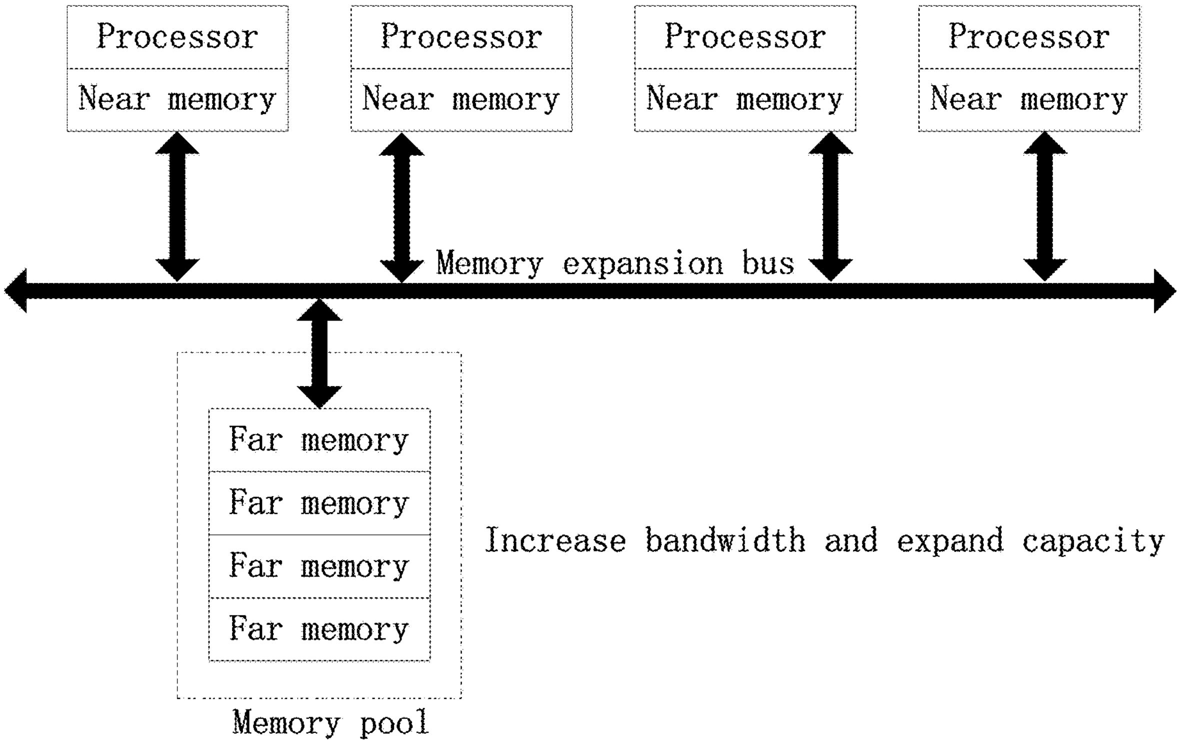
FIG. 1 is a schematic diagram of an ideal solution for memory expansion provided by an embodiment of the present disclosure.

In order to make the purposes, technical solutions and advantages of the embodiments of the present disclosure clearer, the technical solutions in the embodiments of the present disclosure will be clearly and completely described in conjunction with the drawings in the embodiments of the present disclosure. It is apparent that the described embodiments are only a part of the embodiments of the present disclosure, and not all of them. All other embodiments obtained by those of ordinary skill in the art based on the embodiments of the present disclosure without creative efforts are within the scope of protection of the present disclosure.

Embodiments of the present disclosure provide a memory module. The memory module includes at least two MXC chips, a PCIe golden finger, an MCIO connector, and a DIMM. Wherein the memory expander controller chips are connected to the dual inline memory module, at least one of the memory expander controller chips interacts with an external device through the peripheral component interconnect express golden finger, and at least one of the memory expander controller chips interacts with the external device through the multichannel input/output connector.

For exempla, the MXC chips are connected to the DIMM through a Double Data Rate 5 (DDR5) controller port, a CXL port of at least one of the MXC chips interacts with an external device through the PCIe golden finger, and the CXL port of at least one of the MXC chips interacts with the external device through the MCIO connector.

The number of DIMMs in the memory module is determined by the number of DDR5 controller ports, and each of the DDR5 controller ports may be connected to one or two DIMMs.

The memory module provided by the embodiment includes at least two the MXC chips, the PCIe golden finger, the MCIO connector, and the DIMM. The MXC chips are connected to the DIMM through the DDR5 controller port, and the MXC chips also interact with the external device through the PCIe golden finger and the MCIO connector by using own the CXL ports. The memory module is connected to the DIMM through MXC chip expansion, which may improve the memory capacity of the memory module.

In order to expand the capacity of the memory module in this field, it is usually necessary to link two or more servers in parallel, which is complex in structural connection and limited in scope of application. The memory module provided by the embodiment of the present disclosure may be directly connected to the server through the PCIe golden finger and the MCIO connector, and the memory capacity of the memory module may be achieved by inserting a memory bank into the DIMM. The connection manner is simple and has a wide range of applications.

Further, a single board where the memory module is located further includes a clock generator, configured to provide a clock input for the MXC chips through a beat buffer. In the embodiment of the present disclosure, a corresponding SPI flash may further be provided for each of the MXC chips, each of the MXC chips is connected to the corresponding SPI flash, and the SPI flash is configured to store a firmware of a MXC chip, connected to the SPI flash, of the MXC chips.

Further, the single board where the memory module is located further includes a Debug interface, configured to debug the single board.

Further, the single board where the memory module is located further includes a Power connector, configured to provide power input for the memory module.

Further, the single board where the memory module is located is configured to be inserted into a PCIe slot supporting a CXL1.1 protocol platform.

As a further introduction to the embodiment, the memory module may include four MXC chips. In a scenario where the memory module includes four MXC chips, the memory module includes a first MXC chip, a second MXC chip, a third MXC chip, and a fourth MXC chip. Bandwidths of the first MXC chip, the second MXC chip, the third MXC chip, and the fourth MXC chip are identical. For exempla, each of the first MXC chip, the second MXC chip, the third MXC chip, and the fourth MXC chip has a bandwidth of 8 bits.

The first memory expander controller chip and the second memory expander controller chip interact with the external device through the peripheral component interconnect express golden finger.

For exempla, the CXL port of each of the first MXC chip and the second MXC chip interacts with the external device through the PCIe golden finger. The PCIe golden finger may be a PCIe x16 golden finger.

The third memory expander controller chip and the fourth memory expander controller chip interact with the external device through the multichannel input/output connector.

For exempla, the CXL port of each of the third MXC chip and the fourth MXC chip interacts with the external device through the MCIO connector. The MCIO connector may be an MCIO x16 connector.

Further, each of the memory expander controller chips is connected to a plurality of dual inline memory modules.

For exempla, the first MXC chip is connected to two DIMMs through a DDR5 controller port, the second MXC chip is connected to two DIMMs through a DDR5 controller port, the third MXC chip is connected to two DIMMs through a DDR5 controller port, and the fourth MXC chip is connected to two DIMMs through a DDR5 controller port.

The PCIe golden finger is configured to provide a reset signal for the first MXC chip and the second MXC chip, and the MCIO connector qi configured to provide the reset signal for the third MXC chip, and the fourth MXC chip. The PCIe golden finger and the MCIO connector may also provide a clock input for a MXC chip through the beat buffer.

The single board where the memory module is located further includes a clock generator, configured to provide a clock input for the first MXC chip, the second MXC chip, the third MXC chip, and the fourth MXC chip through the beat buffer. In the embodiment, the corresponding SPI flashes may further be provided for the first MXC chip, the second MXC chip, the third MXC chip, and the fourth MXC chip. The first MXC chip is connected to the first SPI flash, and the first SPI flash is configured to store the firmware of the first MXC chip. The second MXC chip is connected to the second SPI flash, and the second SPI flash is configured to store the firmware of the second MXC chip. The third MXC chip is connected to the third SPI flash, and the third SPI flash is configured to store the firmware of the third MXC chip. The fourth MXC chip is connected to the fourth SPI flash, and the fourth SPI flash is configured to store the firmware of the fourth MXC chip.

The memory module provided by the embodiment of the present disclosure includes four MXC chips, the PCIe golden finger, the MCIO connector, and eight DIMMs. The MXC chips are connected to the eight DIMMs through the DDR5 controller port, and the MXC chips also interact with an external device through the PCIe golden finger and the MCIO connector by using own the CXL ports. The memory module expands eight DIMMs through the MXC chips, which may increase the memory capacity of the memory module.

Each of the first MXC chip, the second MXC chip, the third MXC chip, and the fourth MXC chip has one DDR5 controller port, supporting external expansion of two DIMMs at a rate of 4800 Megatransfers per second (MT/s). A total of eight DDR5 DIMMs may be expanded on the single board. In a case where the maximum capacity of each of the DIMMs is calculated as 256 Gigabyte (GB), the maximum capacity of the CXL memory expansion on the single board may reach 2 Terabyte (TB). In a case where the maximum capacity of each of the DIMMs is calculated as 512 GB, the maximum capacity of the CXL memory expansion on the single board may reach 4 TB.

Further, the first MXC chip, the second MXC chip, the third MXC chip, and the fourth MXC chip may select a CXL memory expansion controller chip with x8 bandwidth. The first MXC chip, the second MXC chip, the third MXC chip, and the fourth MXC chip with a bandwidth of 8 bits are placed on the single board. At the same time, one SPI flash is placed corresponding to the first MXC chip, the second MXC chip, the third MXC chip, and the fourth MXC chip, which is configured to store the firmware of the MXC chips. Each of the first MXC chip, the second MXC chip, the third MXC chip, and the fourth MXC chip has one DDR5 controller port, supporting external expansion of two DDR5 DIMMs at a rate of 4800 MT/s. A total of eight DDR5 DIMMs may be expanded on the single board. The maximum capacity of each of the DIMMs is calculated as 256 GB, and the maximum capacity of the CXL memory expansion on the single board may reach 2 TB. In a case where the maximum capacity of each of the DIMMs is calculated as 512 GB, the maximum capacity of the CXL memory expansion on the single board may reach 4 TB. The CXL port of each of the first MXC chip, the second MXC chip, the third MXC chip, and the fourth MXC chip has a x8 bandwidth and support a maximum rate of 32 Gigatransfers per second (GT/s). Two x8 CXL signals (8-bit CXL signals) of the first MXC chip and the second MXC chip interact with the external device through one x16 PCIe golden finger, and two x8 CXL signals of the third MXC chip and the fourth MXC chip interact with the external device through one x16 MCIO. At the same time, the clock signals and the reset signals required by the first MXC chip, the second MXC chip, the third MXC chip, and the fourth MXC chip are provided on the golden finger and the MCIO. The reset signals are directly connected to the first MXC chip, the second MXC chip, the third MXC chip, and the fourth MXC chip. The clock signals are respectively given to the first MXC chip, the second MXC chip, the third MXC chip, and the fourth MXC chip through a one-to-two clock buffer to provide 100 Megahertz (MHZ) clock input. At the same time, in order to avoid the risk of clock jitter due to the long signal link of the clock signals on the golden finger and the MCIO, the clock generator is reserved on the single board to provide independent 100 MHz clock input for the one-to-two clock buffer. The single board management solution of the memory module is that: the first MXC chip, the second MXC chip, the third MXC chip, and the fourth MXC chip exchange information with a host through a System Management Bus (SMBus) protocol. An SMBus signal on the PCIe golden finger is divided into seven channels by PCA9548 (a four-way bidirectional conversion switch controlled by an Inter-Integrated Circuit (I2C) bus), which are respectively connected to the first MXC chip, the second MXC chip, the third MXC chip, the fourth MXC chip, two thermal sensors, and one clock generator. At the same time, an Innovative Inter-Integrated Circuit port (I3C)/I2C (two-line bidirectional serial bus/two-line serial bus) port of each of the MXC chips is used as the host, connected to two DDR5 DIMMs, and exchanges information with the DIMMs. The single board may further provide a debug connector interface configured for single-board debugging. The memory module uses a standard PCIe full-height, ¾-length, and double-width card. The external high-speed IO interface includes one PCIe 5.0 x16 golden finger and one MCIO x16 connector. The power connector is configured to provide 12V power input required by the module, and a 3V3 power supply is connected through the golden finger. The CXL signal on the golden finger expands four DIMMs above through two MXC chips on the left, and the CXL signal on the MCIO expands four DIMMs below through two MXC chips on the right. The entire memory module achieves expansion of eight DIMMs, and the total expansion capacity of the memory module reaches 4 TB.

As a further introduction to the embodiment of the present disclosure, the memory module may include two MXC chips. In a scenario where the memory module includes two MXC chips, the memory module includes a fifth MXC chip and a sixth MXC chip. Bandwidths of the fifth memory expander controller chip and the sixth memory expander controller chip are identical. For exempla, each of the fifth MXC chip and the sixth MXC chip has a bandwidth of 16 bits.

The CXL port of the fifth MXC chip interacts with the external device through the PCIe golden finger. The PCIe golden finger is the PCIe x16 golden finger.

The sixth MXC chip interacts with the external device through the MCIO connector, and the MCIO connector is the MCIO x16 connector.

Further, each of the memory expander controller chips is connected to a plurality of dual inline memory modules.

For exempla, the fifth MXC chip is connected to four DIMMs through a DDR5 controller port, and the sixth MXC chip is connected to four DIMMs through a DDR5 controller port.

The PCIe golden finger is configured to provide the reset signals for the fifth MXC chip, and the MCIO connector is configured to provide the reset signals for the sixth MXC chip. The PCIe golden finger may further provide a clock input for the fifth MXC chip through a beat buffer, and the MCIO connector may further provide a clock input for the sixth MXC chip through a beat buffer.

The single board where the memory module is located further includes a clock generator, configured to provide a clock input for the fifth MXC chip and the sixth MXC chip through the beat buffer. In the embodiment, the corresponding SPI flashes may further be provided for the fifth MXC chip and the sixth MXC chip. The fifth MXC chip is connected to the fifth SPI flash, and the fifth SPI flash is configured to store the firmware of the fifth MXC chip. The sixth MXC chip is connected to the sixth SPI flash, and the sixth SPI flash is configured to store the firmware of the sixth MXC chip.

The memory module provided by the embodiment of the present disclosure includes two MXC chips, the PCIe golden finger, the MCIO connector, and four DIMMs. The MXC chips are connected to four DIMMs through the DDR5 controller port, and the MXC chips also interact with the external device through the PCIe golden finger and the MCIO connector by using own the CXL ports. The memory module expands four DIMMs through the MXC chips, which may increase the memory capacity of the memory module.

Each of the fifth MXC chip and the sixth MXC chip has two DDR5 controller ports, each of which supports external expansion of two DIMMs at a rate of 4800 MT/s. A total of four DDR5 DIMMs may be expanded on the single board. In a case where the maximum capacity of each of the DIMMs is calculated as 256 GB, the maximum capacity of the CXL memory expansion on the single board may reach 2 TB. In a case where the maximum capacity of each of the DIMMs is calculated as 512 GB, the maximum capacity of the CXL memory expansion on the single board may reach 4 TB.

Further, the fifth MXC chip and the sixth MXC chip may select the CXL memory expansion controller chip with x16 bandwidth. A total of two MXC chips are placed on the single board. At the same time, one SPI flash is placed corresponding to the fifth MXC chip and the sixth MXC chip, which is configured to store the firmware of the MXC chips. Each of the fifth MXC chip and the sixth MXC chip has two DDR5 controller ports, and each controller port may support external expansion of two DDR5 DIMMs at a rate of 4800 Mt/s, so that each of the fifth MXC chip and the sixth MXC chip may expand four DDR5 DIMMs, and a total of eight DDR5 DIMMs may be expanded on the single board. The maximum capacity of each of the DIMMs is calculated as 256 GB, and the maximum capacity of the CXL memory expansion on the single board may reach 2 TB. In a case where the maximum capacity of each of the DIMMs is calculated as 512 GB, the maximum capacity of the CXL memory expansion on the single board may reach 4 TB. The CXL port of each of the fifth MXC chip and the sixth MXC chip has an x16 bandwidth, and the maximum rate supports 32 GT/s. The CXL signals of the fifth MXC chip interacts with the external device through one x16 PCIe golden finger, and the CXL signal of the sixth MXC chip interacts with the external device through one x16 MCIO. At the same time, the clock signals and the reset signals required by the fifth MXC chip and the sixth MXC chip are provided on the golden finger and the MCIO. In order to avoid the risk of clock jitter due to the long signal link of the clock signals on the golden finger and the MCIO, the clock generator is reserved on the single board to provide independent 100 MHz clock input for the fifth MXC chip and the sixth MXC chip. The single board management solution is that: the fifth MXC chip and the sixth MXC chip exchange information with the host through the SMBus protocol. The SMBus signal on the PCIe golden finger is divided into four channels by PCA9546, which are respectively connected to the fifth MXC chip, the sixth MXC chip, one thermal sensor, and one clock generator. At the same time, the I3C/I2C port of each of the fifth MXC chip and the sixth MXC chip is used as the hosts, and are connected to four DDR5 DIMMs to exchange information with the DIMMs. The debug connector interface provided by the single board is configured for single board debugging. The structural dimensions of the fifth MXC chip and the sixth MXC chip are both PCIe full-height, ¾-length, and double-width cards. The external high-speed IO interface includes one PCIe 5.0 x16 golden finger and one MCIO x16 connector. The power connector is configured to provide 12V power input required by the module, and the 3V3 power supply is connected through the golden finger. The CXL signal on the golden finger expands four DIMMs above through two MXC chips on the left, and the CXL signal on the MCIO expands four DIMMs below through two MXC chips on the right. The entire memory module achieves expansion of eight DIMMs, and the total expansion capacity of the memory module reaches 4 TB.

As a further introduction to the embodiment of the present disclosure, the memory module may include four MXC chips. In a scenario where the memory module includes four MXC chips, the memory module includes a seventh MXC chip, an eighth MXC chip, and a ninth MXC chip. Each of the seventh MXC chip, the eighth MXC chip, and the ninth MXC chip has a bandwidth of 8 bits.

The CXL port of each of the seventh MXC chip and the eighth MXC chip interacts with the external device through the PCIe golden finger. The PCIe golden finger may be the PCIe x16 golden finger.

The CXL port of the ninth MXC chip interacts with the external device through the MCIO connector. The MCIO connector may be the MCIO x16 connector.

Further, the seventh MXC chip is connected to two DIMMs through a DDR5 controller port, the eighth MXC chip is connected to two DIMMs through a DDR5 controller port, the ninth MXC chip is connected to two DIMMs through a DDR5 controller port.

The PCIe golden finger is configured to provide the reset signals for the seventh MXC chip and the eighth MXC chip, and the MCIO connector is configured to provide the reset signals for the ninth MXC chip. The PCIe golden finger may further provide a clock input for the seventh MXC chip and the eighth MXC chip through a beat buffer, and the MCIO connector may further provide a clock input for the ninth MXC chip through a beat buffer.

The single board where the memory module is located further includes the clock generator, configured to provide a clock input for the seventh MXC chip, the eighth MXC chip, and the ninth MXC chip through the beat buffer. In the embodiment, the corresponding SPI flashes may further be provided for the seventh MXC chip, the eighth MXC chip, and the ninth MXC chip. The seventh MXC chip is connected to the seventh SPI flash, and the seventh SPI flash is configured to store the firmware of the seventh MXC chip. The eighth MXC chip is connected to the eighth SPI flash, and the eighth SPI flash is configured to store the firmware of the eighth MXC chip. The ninth MXC chip is connected to the ninth SPI flash, and the ninth SPI flash is configured to store the firmware of the ninth MXC chip.

The memory module provided by the embodiment of the present disclosure includes four MXC chips, the PCIe golden finger, the MCIO connector, and eight DIMMs. The MXC chips are connected to eight DIMMs through the DDR5 controller port, and the MXC chips also interact with the external device through the PCIe golden finger and the MCIO connector by using own the CXL ports. The memory module expands eight DIMMs through the MXC chips, which may increase the memory capacity of the memory module.

Each of the seventh MXC chip, the eighth MXC chip, and the ninth MXC chip has one DDR5 controller port, supporting external expansion of two DIMMs at a rate of 4800 MT/s. A total of eight DDR5 DIMMs may be expanded on the single board. In a case where the maximum capacity of each of the DIMMs is calculated as 256 GB, the maximum capacity of the CXL memory expansion on the single board may reach 2 TB. In a case where the maximum capacity of each of the DIMMs is calculated as 512 GB, the maximum capacity of the CXL memory expansion on the single board may reach 4 TB.

Further, the seventh MXC chip, the eighth MXC chip, and the ninth MXC chip may select the CXL memory expansion controller chip with x8 bandwidth. A total of the seventh MXC chip, the eighth MXC chip, and the ninth MXC chip with a bandwidth of 8 bits are placed on the single board. At the same time, one SPI flash is placed corresponding to the seventh MXC chip, the eighth MXC chip, and the ninth MXC chip, which is configured to store the firmware of the MXC chips. Each of the seventh MXC chip, the eighth MXC chip, and the ninth MXC chip has one DDR5 controller port, supporting external expansion of two DDR5 DIMMs at a rate of 4800 MT/s. A total of eight DDR5 DIMMs may be expanded on the single board. The maximum capacity of each of the DIMMs is calculated as 256 GB, and the maximum capacity of the CXL memory expansion on the single board may reach 2 TB. In a case where the maximum capacity of each of the DIMMs is calculated as 512 GB, the maximum capacity of the CXL memory expansion on the single board may reach 4 TB. The CXL port of each of the seventh MXC chip, the eighth MXC chip, and the ninth MXC chip has an x8 bandwidth, and support a maximum rate of 32 GT/s. Two x8 CXL signals of the seventh MXC chip and the eighth MXC chip interact with the external device through one x16 PCIe golden finger, and two x8 CXL signals of the ninth MXC chip interact with the external device through one x16 MCIO. At the same time, a clock signals and a reset signals required by the seventh MXC chip and the eighth MXC chip are provided on the golden finger, and a clock signals and a reset signals required by the ninth MXC chip are provided on the MCIO. The reset signals are directly connected to the seventh MXC chip, the eighth MXC chip, and the ninth MXC chip. The clock signals are respectively given to the seventh MXC chip, the eighth MXC chip, and the ninth MXC chip through the one-to-two clock buffer to provide 100 MHz clock input. At the same time, in order to avoid the risk of clock jitter due to the long signal link of the clock signals on the golden finger and the MCIO, the clock generator is reserved on the single board to provide independent 100 MHz clock input for the one-to-two clock buffer. The single board management solution of the memory module is that: the seventh MXC chip, the eighth MXC chip, and the ninth MXC chip exchange information with the host through the SMBus protocol. The SMBus signal on the PCIe golden finger is divided into seven channels by PCA9548, which are respectively connected to the seventh MXC chip, the eighth MXC chip, the ninth MXC chip, two thermal sensors, and one clock generator. At the same time, the I3C/I2C port of each of the MXC chips is used as the host, connected to two DDR5 DIMMs, and exchanges information with the DIMMs. The single board may further provide the debug connector interface configured for single-board debugging. The memory module uses the standard PCIe full-height, ¾-length, and double-width card. The external high-speed IO interface includes one PCIe 5.0 x16 golden finger and one MCIO x16 connector. The power connector is configured to provide 12V power input required by the module, and the 3V3 power supply is connected through the golden finger. The CXL signal on the golden finger expands four DIMMs above through two MXC chips on the left, and the CXL signal on the MCIO expands four DIMMs below through two MXC chips on the right. The entire memory module achieves expansion of eight DIMMs, and the total expansion capacity of the memory module reaches 4 TB.

The process described in the embodiment of the present disclosure is explained below through the embodiments in actual applications.

With the continuous development of computer technology, computing density continues to grow, while memory and I/O scalability lags far behind the growth in computing density, and the average memory and I/O bandwidth per core continues to decline. In addition, computing data is currently growing exponentially year by year, and the demand for memory capacity is increasing. In some scenarios, performance has to be sacrificed in exchange for memory capacity expansion, which hinders the development of high-performance computing and AI computing to a certain extent.

In order to solve the above problems, an ideal solution for memory expansion is as shown in FIG. 1. FIG. 1 is a schematic diagram of an ideal solution for memory expansion provided by an embodiment of the present disclosure, and FIG. 1 shows a processor, a near memory, a memory expansion bus, and a memory pool including a far memory. The memory is expanded separately through the memory expansion bus to achieve the effects of increasing bandwidth and improving capacity.

The embodiment provides a large-capacity memory module based on the above solution idea, in which the memory expansion bus uses a CXL protocol. Compared with the conventional parallel memory DDR DIMM solution, the memory capacity and bandwidth may be greatly expanded to meet the growing needs of data-intensive applications such as high-performance computing and AI. At the same time, the architecture solution of the present disclosure uses a standard PCIe Add in Card (AIC) form (full height, ¾ length, and double width), which may be inserted into a standard PCIe slot that supports the CXL1.1 protocol platform and has good compatibility with current server products.

The CXL protocol is an open industrial standard for high-bandwidth and low-latency device interconnection. The CXL protocol may be configured to connect devices such as a Central Processing Unit (CPU), an accelerator, a memory buffer, and a smart Network Interface Card (NIC) for use in AI machine learning, high-performance computing, and other scenarios.

The embodiment provides the large-capacity memory module, which may support single-card memory capacity expansion of up to 4 TB in a full-height, ¾-length and double-width standard PCIe AIC size. On the premise of the original DRAM of a computing node, the memory capacity and bandwidth may be further greatly expanded to meet the growing needs of data-intensive applications such as high-performance computing and AI. At the same time, the present disclosure may be inserted into the standard PCIe slot that supports the CXL1.1 protocol platform and has good compatibility with current server products.

Figure 2:
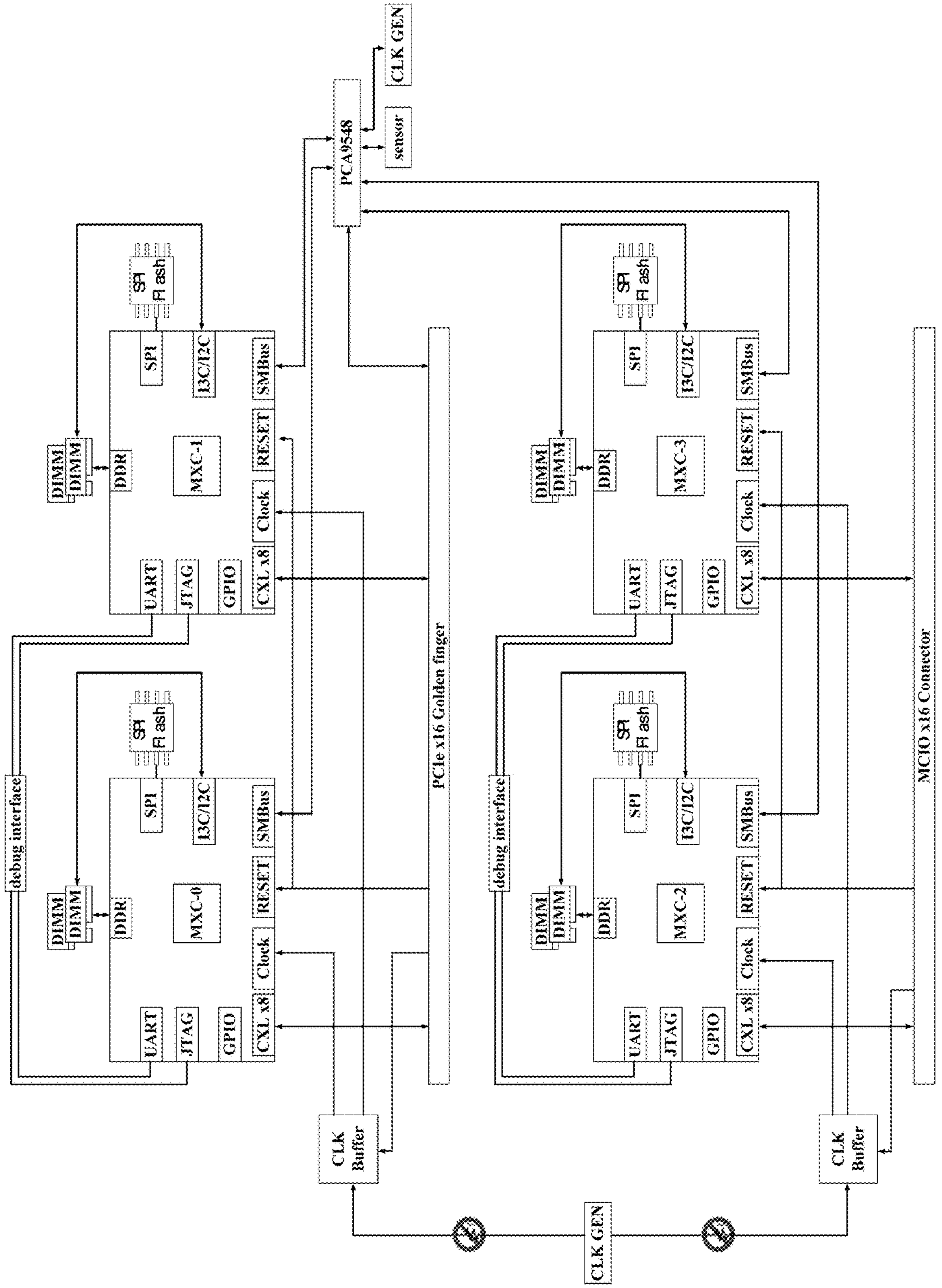
FIG. 2 is a schematic topological diagram of a first large-capacity memory module provided by an embodiment of the present disclosure.
Figure 4:
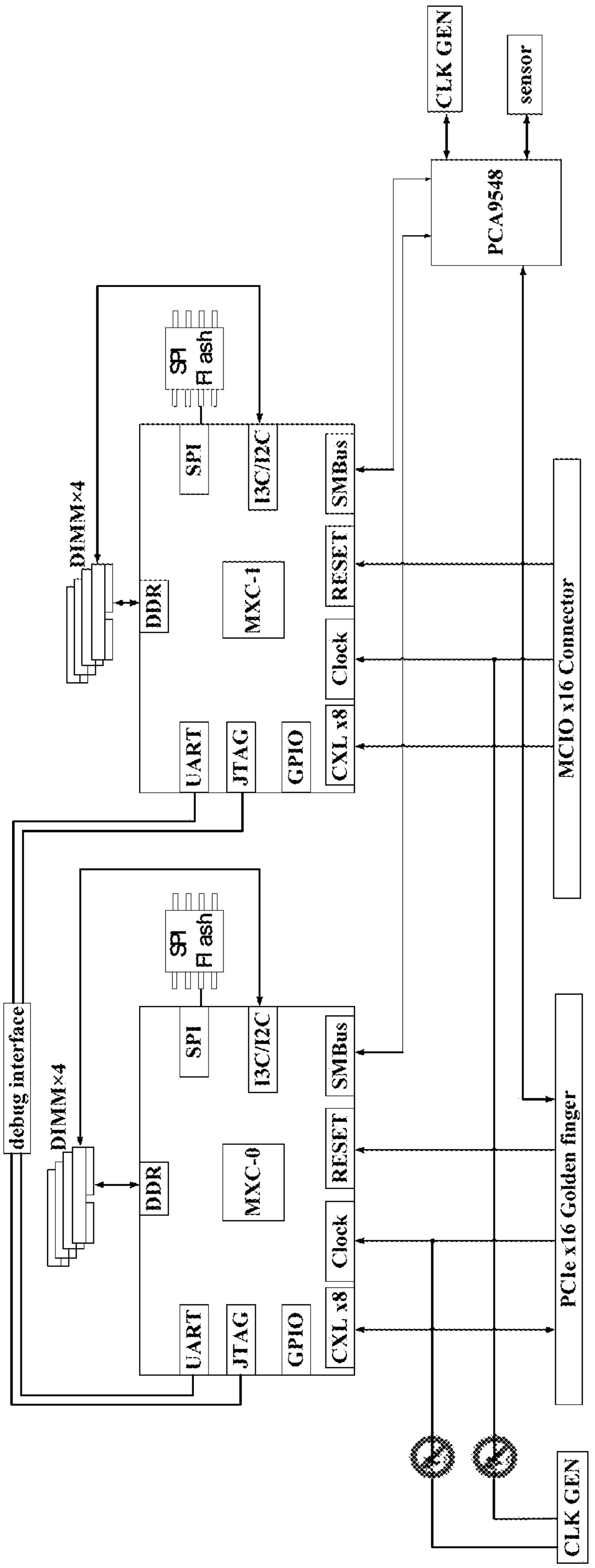
FIG. 4 is a schematic topological diagram of a second large-capacity memory module provided by an embodiment of the present disclosure.

Referring to FIG. 2, FIG. 2 is a schematic topological diagram of a first large-capacity memory module provided by an embodiment of the present disclosure. In FIG. 2 and FIG. 4, MXC-0, MXC-1, MXC-2, and MXC-3 represent MXC chips, DDR represents a double-rate synchronous DRAM interface, Universal Asynchronous Receiver/Transmitter (UART) represents a universal asynchronous receiver/transmitter, SPI represents a serial peripheral interface, Joint Test Action Group (JTAG) represents a joint test action group, General-purpose input/output (GPIO) represents a general-purpose input/output interface, I3C represents a two-wire bidirectional serial bus, I2C represents a two-wire serial bus, CXL x8 represents an 8-bit CXL signal, Clock represents a clock, RESET represents a reset, SMBus represents a system management bus, CLK Buffer represents a clock buffer, CLK GEN represents a clock generator, PCA9548 is an I2C bus extension device, and PCA9546A is a four-way bidirectional conversion switch controlled by the I2C bus.

The MXC chips in FIG. 2 may select the CXL memory expansion controller chip with x8 bandwidth. A total of four MXC chips with a bandwidth of 8 bits are placed on the single board, and one SPI flash is placed corresponding to each of the MXC chips, which is configured to store the firmware of a MXC chip, connected to the SPI flash, of the MXC chips. The MXC chip has one DDR5 controller port, supporting external expansion of two DDR5 DIMMs at a rate of 4800 MT/s. A total of eight DDR5 DIMMs may be expanded on the single board. The maximum capacity of each of the DIMMs is calculated as 256 GB, and the maximum capacity of the CXL memory expansion on the single board may reach 2 TB. When the maximum capacity of each of the DIMMs is calculated as 512 GB, the maximum capacity of the CXL memory expansion on the single board may reach 4 TB. The CXL port of the MXC chips has an x8 bandwidth, and the maximum rate supports 32 GT/s. Two x8 CXL signals of the two MXC chips interact with the external device through one x16 PCIe golden finger, and two x8 CXL signal of another two MXC chips interact with the external device through one x16 MCIO. At the same time, the clock signals and the reset signals required by the MXC chips are provided on the golden finger and the MCIO. The reset signals are directly connected to the MXC chips. The clock signals are respectively given to two MXC chips through the one-to-two clock buffer to provide 100 MHz clock input for the MXC chips. At the same time, in order to avoid the risk of clock jitter due to the long signal link of the clock signals on the golden finger and the MCIO, the clock generator is reserved on the single board to provide independent 100 MHz clock input for the one-to-two clock buffer. The single board management solution is that: the MXC chips exchange information with the host through the SMBus protocol. The SMBus signal on the PCIe golden finger is divided into seven channels by PCA9548, which are respectively connected to four MXC chips, two thermal sensors, and one clock generator. At the same time, the I3C/I2C port of each of the MXC chips is used as the host, and is connected to two DDR5 DIMMs to exchange information with the DIMM. The debug connector interface provided by the single board is configured for single board debugging.

Figure 3:
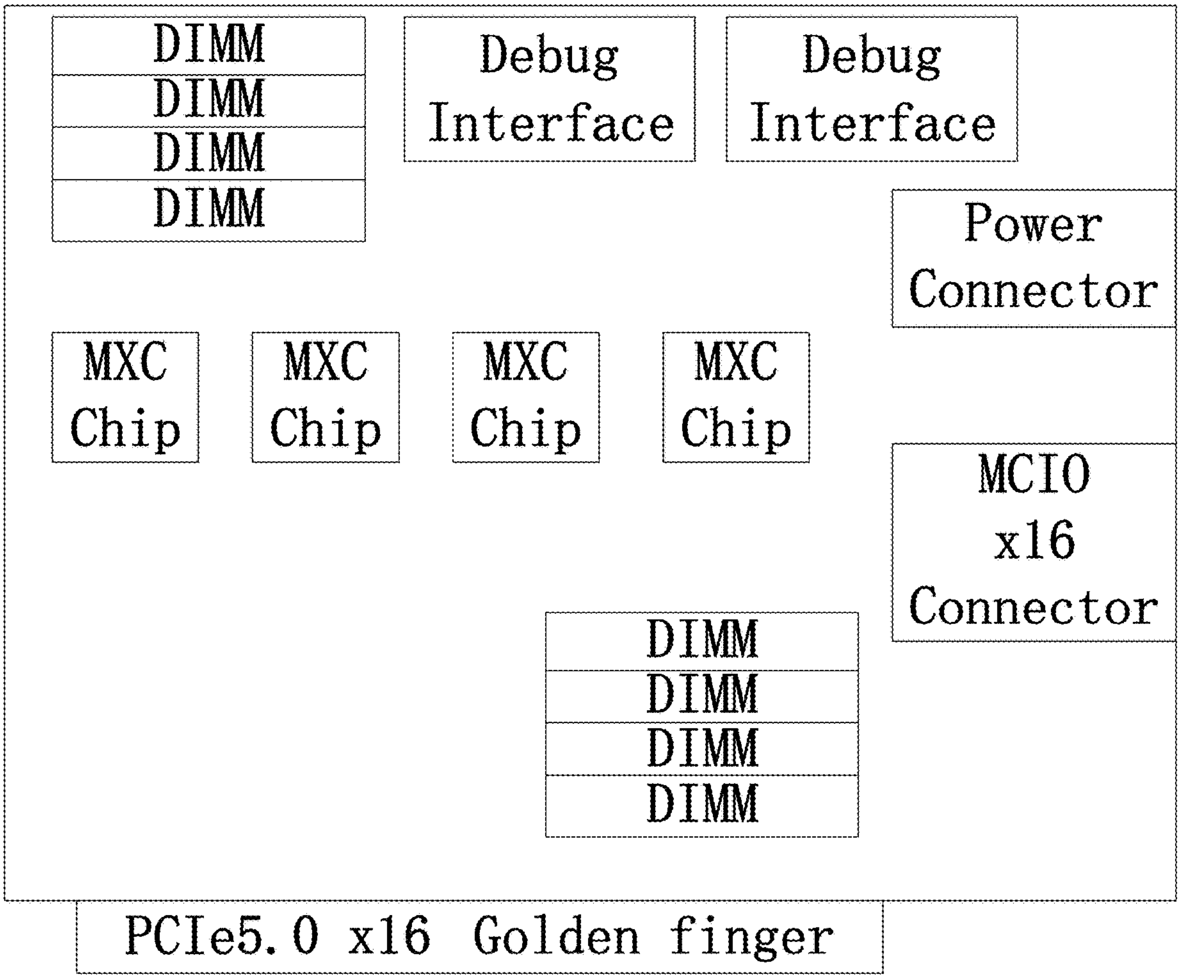
FIG. 3 is a schematic structural diagram of a first large-capacity memory module provided by an embodiment of the present disclosure.

Referring to FIG. 3, FIG. 3 is a schematic structural diagram of a first large-capacity memory module provided by an embodiment of the present disclosure. The memory module structurally uses a standard full-height, ¾-length, and double-width card. The external high-speed IO interface includes one PCIe 5.0 x16 golden finger and one MCIO x16 connector. The power connector is configured to provide 12V power input required by the module, and a 3V3 power supply is connected through the golden finger. The CXL signal on the golden finger expands four DIMMs above through two MXC chips on the left, and the CXL signal on the MCIO expands four DIMMs below through two MXC chips on the right. The entire memory module achieves expansion of eight DIMMs, and the total expansion capacity of the memory module reaches 4 TB.

The memory module provided by the embodiment of the present disclosure includes four MXC chips, the PCIe golden finger, the MCIO connector, and a plurality of DIMMs. The MXC chips are connected to the DIMMs through the DDR5 controller port, and the MXC chips also interact with the external device through the PCIe golden finger and the MCIO connector by using own the CXL ports. The memory module expands the plurality of DIMMs through the MXC chips, which may increase the memory capacity of the memory module.

Referring to FIG. 4, FIG. 4 is a schematic topological diagram of a second large-capacity memory module provided by an embodiment of the present disclosure. The MXC chips may select the CXL memory expansion controller chip with x16 bandwidth. A total of 2 pcs MXC chips are placed on the single board. At the same time, one SPI flash is placed corresponding to each of the MXC chips, which is configured to store the firmware of a MXC chip, connected to the SPI flash, of the MXC chips. The MXC chip has two DDR5 controller ports, and each of the controller ports may support external expansion of two DDR5 DIMMs at a rate of 4800 Mt/s, so that each of the MXC chips may expand four DDR5 DIMMs, and a total of eight DDR5 DIMMs may be expanded on the single board. The maximum capacity of each of the DIMMs is calculated as 256 GB, and the maximum capacity of the CXL memory expansion on the single board may reach 2 TB. When the maximum capacity of each of the DIMMs is calculated as 512 GB, the maximum capacity of the CXL memory expansion on the single board may reach 4 TB. The CXL port of the MXC chips has an x16 bandwidth, and the maximum rate supports 32 GT/s. The CXL signals of the MXC chip interacts with the external device through one x16 PCIe golden finger, and the CXL signal of the other MXC chip interacts with the external device through one x16 MCIO. At the same time, the clock signals and the reset signals required by the MXC chips are provided on the golden finger and the MCIO. In order to avoid the risk of clock jitter due to the long signal link of the clock signals on the golden finger and the MCIO, the clock generator is reserved on the single board to provide independent 100 MHz clock input for the MXC chips. The single board management solution is that: the MXC chips exchange information with the host through the SMBus protocol. The SMBus signal on the PCIe golden finger is divided into four channels by PCA9546, which are respectively connected to two MXC chips, one thermal sensor, and one clock generator. At the same time, the I3C/I2C port of each of the MXC chips is used as the host, and is connected to four DDR5 DIMMs to exchange information with the DIMMs. The debug connector interface provided by the single board is configured for single board debugging.

Figure 5:
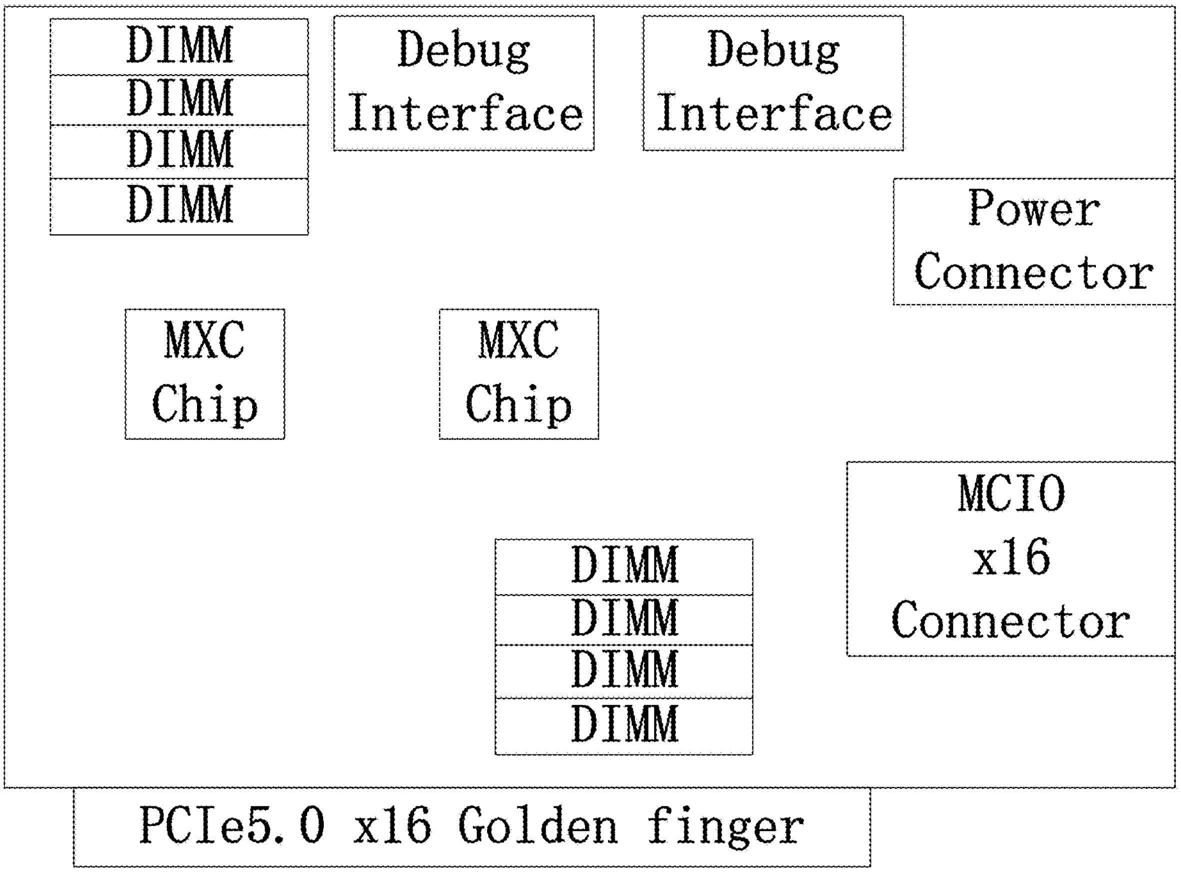
FIG. 5 is a schematic structural diagram of a second large-capacity memory module provided by an embodiment of the present disclosure.

Referring to FIG. 5, FIG. 5 is a schematic structural diagram of a second large-capacity memory module provided by an embodiment of the present disclosure. The memory module structurally uses a full-height, ¾-length, and double-width card. The external high-speed IO interface includes one PCIe 5.0 x16 golden finger and one MCIO x16 connector. The power connector is configured to provide 12V power input required by the module, and the 3V3 power supply is connected through the golden finger. The CXL signal on the golden finger expands four DIMMs above through two MXC chips on the left, and the CXL signal on the MCIO expands four DIMMs below through two MXC chips on the right. The entire memory module achieves expansion of eight DIMMs, and the total expansion capacity of the memory module reaches 4 TB.

The memory module provided by the embodiment of the present disclosure includes two MXC chips, the PCIe golden finger, the MCIO connector, and a plurality of DIMMs. The MXC chips are connected to the DIMMs through the DDR5 controller port, and the MXC chips also interact with the external device through the PCIe golden finger and the MCIO connector by using own the CXL ports. The memory module expands the plurality of DIMMs through the MXC chips, which may increase the memory capacity of the memory module.

The embodiment provides a design solution of the large-capacity memory module, which may support single-card memory capacity expansion of up to 4 TB in a full-height, ¾-length and double-width standard PCIe AIC size. On the premise of the original DRAM of a computing node, the memory capacity and bandwidth may be further greatly expanded to meet the growing needs of data-intensive applications such as high-performance computing and AI. At the same time, the present disclosure may be inserted into the standard PCIe slot that supports the CXL1.1 protocol platform and has good compatibility with current server products. The embodiment may effectively solve the memory capacity expansion demand under the background of data-intensive application demands.

The embodiments of the present disclosure further provide an electronic device. The electronic device is provided with a memory module including at least two MXC chips, a PCIe golden finger, an MCIO connector, and a DIMM.

The memory expander controller chips are connected to the dual inline memory module, at least one of the memory expander controller chips interacts with an external device through the peripheral component interconnect express golden finger, and at least one of the memory expander controller chips interacts with the external device through the multichannel input/output connector.

For exempla, the MXC chips are connected to the DIMM through a DDR5 controller port, a CXL port of at least one of the MXC chips interacts with the external device through the PCIe golden finger, and the CXL port of at least one of the MXC chips interacts with the external device through the MCIO connector.

The memory module provided by the embodiment of the present disclosure includes at least two the MXC chips, the PCIe golden finger, the MCIO connector, and the DIMM. The MXC chips are connected to the DIMM through the DDR5 controller port, and the MXC chips also interact with the external device through the PCIe golden finger and the MCIO connector by using own the CXL ports. The memory module is connected to the DIMM through MXC chips expansion, which may improve the memory capacity of the memory module.

Optionally, the memory module includes a first MXC chip, a second MXC chip, a third MXC chip, and a fourth MXC chip. Bandwidths of the first MXC chip, the second MXC chip, the third MXC chip, and the fourth MXC chip are identical. For exempla, each of the first MXC chip, the second MXC chip, the third MXC chip, and the fourth MXC chip has a bandwidth of 8 bits.

Optionally, the first memory expander controller chip and the second memory expander controller chip interact with the external device through the peripheral component interconnect express golden finger.

Optionally, the CXL port of each of the first MXC chip and the second MXC chip interacts with the external device through the PCIe golden finger, and the PCIe golden finger is a PCIe x16 golden finger.

Optionally, the third memory expander controller chip and the fourth memory expander controller chip interact with the external device through the multichannel input/output connector.

Optionally, the CXL port of each of the third MXC chip and the fourth MXC chip interacts with the external device through the MCIO connector, and the MCIO connector is an MCIO x16 connector.

Optionally, each of the memory expander controller chips is connected to a plurality of dual inline memory modules.

Optionally, each of the MXC chips is connected to two DIMMs through the DDR5 controller port.

Optionally, the memory module includes a fifth MXC chip and a sixth MXC chip. Bandwidths of the fifth MXC chip and the sixth MXC chip are identical. For exempla, each of the fifth MXC chip and the sixth MXC chip has a bandwidth of 16 bits.

Optionally, the fifth memory expander controller chip interacts with the external device through the peripheral component interconnect express golden finger.

Optionally, the CXL port of the fifth MXC chip interacts with the external device through the PCIe golden finger, and the PCIe golden finger is the PCIe x16 golden finger.

Optionally, the sixth memory expander controller chip interacts with the external device through the multichannel input/output connector.

Optionally, the sixth MXC chip interacts with the external device through the MCIO connector, and the MCIO connector is the MCIO x16 connector.

Optionally, each of the memory expander controller chips is connected to a plurality of dual inline memory modules. For exempla, each of the MXC chips is connected to four DIMMs through the DDR5 controller port.

Optionally, the PCIe golden finger is configured to provide a clock input for a MXC chip which is connected to the PCIe golden finger through a beat buffer, and the MCIO connector is configured to provide a clock input for a MXC chip which is connected to the MCIO connector through a beat buffer.

Optionally, a single board where the memory module is located further includes a clock generator, configured to provide a clock input for the MXC chips through the beat buffer.

Since the embodiment of the electronic device part and the embodiment of the memory module part correspond to each other, the embodiment of the electronic device part and the description of the embodiment of the memory module part may be referred to each other, which will not be elaborated herein.

The various embodiments in the present specification are described in a progressive manner, and each embodiment focuses on differences from other embodiments, and the same similar parts between the various embodiments may be referred to each other. For the apparatus disclosed in the embodiment, since it corresponds to the method disclosed in the embodiment, the description is relatively simple, and the relevant parts may be referred to the method part. It is to be noted that a number of variations and modifications may be made by those of ordinary skill in the art without departing from the principle of the present disclosure, and all fall within the scope of protection of the claims of the present disclosure.

It is also to be noted that relational terms “first”, “second” and the like in the specification are adopted only to distinguish one entity or operation from another entity or operation and not always to require or imply existence of any such practical relationship or sequence between the entities or operations. Furthermore, terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The invention claimed is:

1. A memory module, comprising at least two memory expander controller chips, a peripheral component interconnect express golden finger, a multichannel input/output connector, and dual inline memory modules;

wherein the at least two memory expander controller chips are connected to the dual inline memory modules, at least one of the memory expander controller chips interacts with an external device through the peripheral component interconnect express golden finger, and at least one of the memory expander controller chips interacts with the external device through the multichannel input/output connector.

2. The memory module according to claim 1, wherein the memory module comprises a first memory expander controller chip, a second memory expander controller chip, a third memory expander controller chip, and a fourth memory expander controller chip, and wherein bandwidths of the first memory expander controller chip, the second memory expander controller chip, the third memory expander controller chip, and the fourth memory expander controller chip are identical.

3. The memory module according to claim 2, wherein the first memory expander controller chip and the second memory expander controller chip interact with the external device through the peripheral component interconnect express golden finger, and/or the third memory expander controller chip and the fourth memory expander controller chip interact with the external device through the multichannel input/output connector; and/or each of the memory expander controller chips is connected to more than one of the dual inline memory modules.

4. The memory module according to claim 1, wherein the memory module comprises a fifth memory expander controller chip and a sixth memory expander controller chip, and wherein bandwidths of the fifth memory expander controller chip and the sixth memory expander controller chip are identical.

5. The memory module according to claim 4, wherein the fifth memory expander controller chip interacts with the external device through the peripheral component interconnect express golden finger, and/or the sixth memory expander controller chip interacts with the external device though the multichannel input/output connect; and/or each of the memory expander controller chips is connected to more than one of the dual inline memory modules.

6. The memory module according to claim 1, wherein the peripheral component interconnect express golden finger is configured to provide a first reset signal for at least one of the memory expander controller chips which is connected to the peripheral component interconnect express golden finger, and the multichannel input/output connector is configured to provide a second reset signal for at least one of the memory expander controller chips which is connected to the multichannel input/output connector; and/or the peripheral component interconnect express golden finger is configured to provide a first clock input for at least one of the memory expander controller chips which is connected to the peripheral component interconnect express golden finger through a first beat buffer, and the multichannel input/output connector is configured to provide a second clock input for at least one of the memory expander controller chips which is connected to the multichannel input/output connect through a second beat buffer.

7. The memory module according to claim 1, wherein a single board where the memory module is located further comprises a clock generator, configured to provide a clock input for all the memory expander controller chips through a beat buffer; and/or the single board where the memory module is located further comprises a debug interface, configured to debug the single board; or/and the single board where the memory module is located further comprises a power connector, configured to provide a power input for the memory module; or/and the single board where the memory module is located is configured to be inserted into a peripheral component interconnect express slot.

8. The memory module according to claim 1, wherein each of the at least two memory expander controller chips is connected to a corresponding serial peripheral interface flash, the corresponding serial peripheral interface flash is configured to store a firmware of the corresponding memory expander controller chip, connected to the corresponding serial peripheral interface flash, of the at least two memory expander controller chips.

9. The memory module according to claim 1, wherein the memory module is directly connected to a server through the peripheral component interconnect express golden finger and the multichannel input/output connector.

10. An electronic device, wherein the electronic device is provided with a memory module comprising at least two memory expander controller chips, a peripheral component interconnect express golden finger, a multichannel input/output connector, and dual inline memory modules;

wherein the at least two memory expander controller chips are connected to the dual inline memory modules, at least one of the memory expander controller chips interacts with an external device through the peripheral component interconnect express golden finger, and at least one of the memory expander controller chips interacts with the external device through the multichannel input/output connector.

11. The electronic device according to claim 10, wherein the memory module comprises a first memory expander controller chip, a second memory expander controller chip, a third memory expander controller chip, and a fourth memory expander controller chip, wherein bandwidths of the first memory expander controller chip, the second chip, the third memory expander controller chip, and the fourth memory expander controller chip are identical.

12. The electronic device according to claim 11, wherein the first memory expander controller chip and the second memory expander controller chip interact with the external device through the peripheral component interconnect express golden finger; and/or the third memory expander controller chip and the fourth memory expander controller chip interact with the external device through the multichannel input/output connector; and/or each of the memory expander controller chips is connected to more than one of the dual inline memory modules.

13. The electronic device according to claim 10, wherein the memory module comprises a fifth memory expander controller chip and a sixth memory expander controller chip, wherein bandwidths of the fifth memory expander controller chip and the sixth memory expander controller chip are identical.

14. The electronic device according to claim 13, wherein the fifth memory expander controller chip interacts with the external device through the peripheral component interconnect express golden finger, and/or the sixth memory expander controller chip interacts with the external device through the multichannel input/output connector.

15. The electronic device according to claim 13, wherein each of the memory expander controller chips is connected to more than one of the dual inline memory modules.

16. The electronic device according to claim 10, wherein the peripheral component interconnect express golden finger is configured to provide a first clock input for at least one of the memory expander controller chips which is connected to the peripheral component interconnect express golden finger through a first beat buffer, and the multichannel input/output connector is configured to provide a second clock input for at least one of the memory expander controller chips which is connected to the multichannel input/output connector through a second beat buffer.

17. The electronic device according to claim 10, wherein a single board where the memory module is located further comprises a clock generator, configured to provide a clock input for the at least two memory expander controller chips through a beat buffer.

18. The electronic device according to claim 10, wherein the memory module is directly connected to a server through the peripheral component interconnect express golden finger and the multichannel input/output connector.

19. The memory module according to claim 1, wherein each of the at least two memory expander controller chips is connected to one or more dual inline memory module of the dual inline memory modules through a double data rate 5 (DDR5) synchronous dynamic random access memory interface controller port; a compute express link port of the at least one of the memory expander controller chips that interacts with the external device through the peripheral component interconnect express golden finger, and the compute express link port of the at least one of the memory expander controller chips that interacts with the external device through the multichannel input/output connector.

20. The electronic device according to claim 10, wherein each of the at least two memory expander controller chips is connected to one or more dual inline memory module of the dual inline memory modules through a double data rate 5 (DDR5) synchronous dynamic random access memory interface controller port; a compute express link port of the at least one of the memory expander controller chips that interacts with the external device through the peripheral component interconnect express golden finger, and the compute express link port of the at least one of the memory expander controller chips that interacts with the external device through the multichannel input/output connector.

* * * * *